United States Patent [19]

Mumpower

[11] Patent Number: 5,073,789
[45] Date of Patent: Dec. 17, 1991

[54] MEANS AND METHODS FOR CREATING MULTIPLE IMAGES ON A SINGLE FILM FRAME

[76] Inventor: Ronald M. Mumpower, 27250 N. 64th St., Cave Creek, Ariz. 85331

[21] Appl. No.: 621,281

[22] Filed: Nov. 30, 1990

[51] Int. Cl.⁵ ............................................. G03B 11/00
[52] U.S. Cl. ................................................. 354/122
[58] Field of Search ........................ 354/122, 125, 296

[56] References Cited

U.S. PATENT DOCUMENTS

| 4,012,748 | 3/1977 | Lemanski | 354/122 |
| 4,484,805 | 11/1984 | Gizzio | 354/122 |
| 4,506,964 | 3/1985 | Hayles | 354/122 |

Primary Examiner—Michael L. Gellner
Attorney, Agent, or Firm—Richard R. Mybeck

[57] ABSTRACT

Means and methods for creating multiple images on a single film frame including a divergent shield member mountable for selective rotation upon a camera lens housing and having means operatively associated therewith for selectively positioning a imager means having multiple openings defined therethrough in complementary relationship to each other so that each opening exposes a different corresponding portion of the film frame while interdicting all other portions of the film frame. The assembly includes locking means coactive with detents strategically defined in the imager means to precisely position each opening relative to the field of view of the camera associated therewith.

11 Claims, 2 Drawing Sheets

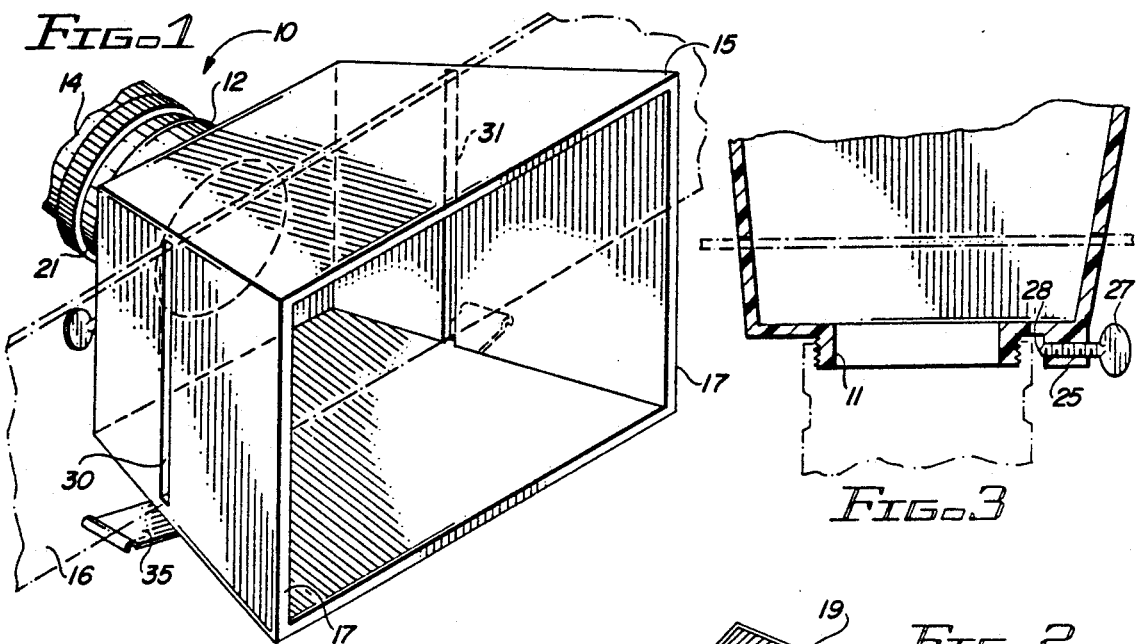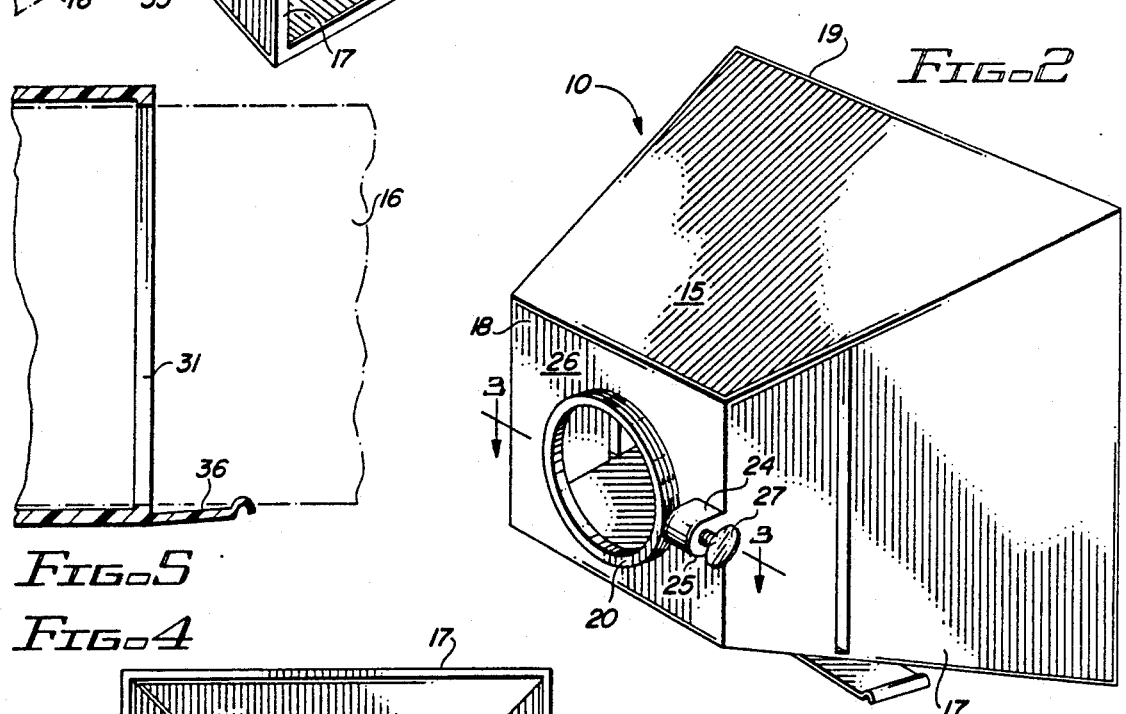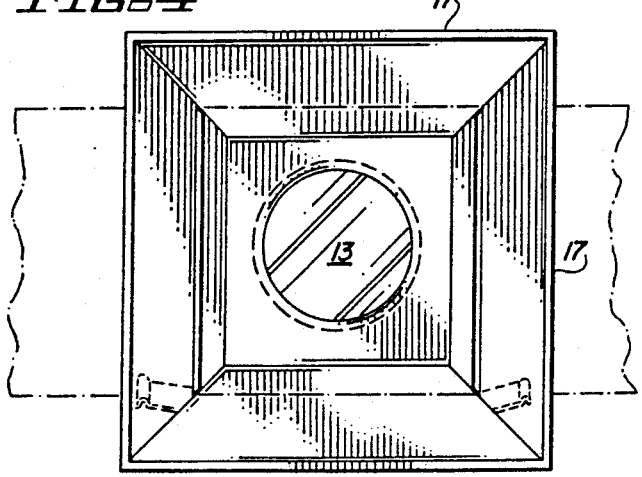

MEANS AND METHODS FOR CREATING MULTIPLE IMAGES ON A SINGLE FILM FRAME

INTRODUCTION

The present invention relates generally to means and methods for creating a photo montage-type photograph and more particularly to a novel and unique imaging assembly for attachment to a camera which enables a novice by simple adjustments to effect multiple images upon a single film frame.

BACKGROUND OF THE PRESENT INVENTION

The prior art includes several attempts to provide means for creating a composite image and/or vignette upon light sensitive material and without special darkroom procedures.

Early work by Kuhn (U.S. No. 369,453), Dreyfoos U.S. No. 1,118,640), Howard U.S. No. 1,137,975), and Folger (U.S. No. 1,197,811) taught various vignettes in which the vignetting screen is interposed between the camera lens and the object to be photographed and can be quickly and easily adjusted in any direction with or without a supporting hood.

Leavitt et al (U.S. No. 2,186,610) teaches a lens hood which is positioned in the front of the objective lens of the camera and permits a plurality of blended or overlapping exposures to be made on a single sheet of sensitized material such as photographic film. The lens hood is provided with a plurality of sliding curtain members which may be adjusted to provide a exposure opening of sufficient size to expose only the desired portion of the sensitized film which is positioned in the focal plane of the camera. After such an exposure is made, the curtains are rearranged to provide a different exposure opening to expose another portion of the sensitized film. This folding procedure is repeated until all of the desired portions of the film have been separately exposed. As the curtains on the lens hood are adjacent the camera lens, the marginal edges of each exposure are not clear cut but instead blend into the adjacent exposures. Such an arrangement provides a picture containing a plurality of blended exposures in a single frame.

Splendore U.S. No. 3,122,077 also teaches a lens attachment for obtaining multiple exposures upon a single film surface by selectively exposing different sections of the film surface in a manner calculated to eliminate traces of overlap. The lens attachment includes a sleeve member which is frictionally engaged and rotatable relative to the lens barrel and includes a generally cylindrical hood member having an aperture at one end thereof. As the hood is rotated, the aperture is rotated to various preselected positions to create a multiple imaged photograph.

Horveth et al (U.S. No. 3,765,314) teaches a camera attachment Which slips over the lens mount of the camera, is cylindrical in shape, and has an opening that shades approximates one half of the film when the picture is taken. By rotating the device 180°, the second portion of the film is exposed thus allowing two scenes to be recorded on one frame of film any be combining into one picture.

Savage (U.S. No. 3,918,078) teaches a slotted mat box for use with a camera in which a preselected mat is placed in the slot any fages out the edges of the film any blocks out a preselected area of the film.

Bodnar I (U.S. No. 3,940,775) also teaches means and methods of exposing a film frame while masking a preselected portion of the field of exposure by a first mask and then reexposing the same film by means of the same lens with a second mask which masks the previously unmasked portion which requires utilizing the same F-stop if the same lens is used for both exposures.

Lorener et al (U.S. No. 4.122,470) discloses an attachment for a camera for creating a photo montage by taking a separate picture on a different area of the same film. Hinged blinds are used to selectively mask fixed preselected portions of the film so that the masked portions will remain unexposed until intentionally exposed, and will not be reexposed after exposure.

Huber (U.S. No. 4,124,859) discloses a vignetting system for cameras including a housing Which attaches directly to the lens element of the camera and supports a series of vignetting lids at the remote end thereof. Each lid has an aperture formed therethrough of preselected size and shape to produce desired vignette. The lid is rotatable relative to the housing into positive engagement at one of a multiplicity of precisely defined sites. By combining different lids in the course of making multiple exposures on a single film frame, a multiple vignette is created.

Hayles I (U.S. No. 4,423,939) teaches a camera attachment for producing multiple images on different portions of a single film frame. A mask containing multiple openings of diverse shape and size is slidably mountable to move along predetermined path transverse to the camera lens to maintain a predefined relationship between the mask and the lens and to compensate for changes in light.

Hayles II (U.S. No. 4,506,964), teaches an attachment for a camera to provide multiple imaging and vignetting effects. A mask is provided which transmits light to selected portions of the camera film frame while blocking light to other portions. The ask is rotated by a coupler housing to permit light to be transmitted to other sections of the film in sequence.

Thomas (U.S. No. 4,708,449) teaches a masking apparatus for forming multiple exposure photographic images in which a plurality of cards of complimentary sizes and shapes are used to register ia precise, reselected position with respect to each other upon a camera. Registering is provided for sequentially mounting each card upon the camera so that the apertures are in different complimentary positions with respect to the film upon which the multiple exposure photograph images are desired.

Guez (U.S.. No. 4,827,291A) reaches a photographic accessory for making superimposed photographs on the same frame of film by exposing selected portions o the negative by shielding other portions o he negative from exposure and then utilizing additional masks to expose previously unexposed portions and complete the multiple image photograph.

From e above, it is apparent that many efforts have been made to provide multiple images on a single film frame. However, in spite o the extensive effort, there still exists a need for a fool-proof, light weight, precisely controllable imaging assembly which is readily usable with off the shelf cameras and which will produce professional quality multiple image photographs without darkroom manipulation or time consuming setup. It is toward this goal that he present invention is directed.

BRIEF SUMMARY OF THE PRESENT INVENTION

The present invention relates to a novel and unique imaging assembly for attachment to a standard camera for producing multiple image photographs in an easily mastered fashion. the imaging assembly comprises a hood or mat box attachable to the lens mount of a conventional camera and extends outwardly therefrom to define a opening which circumscribes the filed of view of the camera. The hood is rotatable, relative the camera lens, through 360°. The hood is provided with two opposing slots, each strategically disposed relative to the camera lens and in registry with each other, and including means to receive and secure an elongated view imager or "Graphic Imager" therewithin. Each imager contains a plurality of strategically defined openings defined therethrough which function to allow the camera to expose a different preselected portion of unexposed film, while masking the rest. All of several exposures coact to form a complete photographic representation in which the several images are prematched and coact with one another to form a composite image of photo montage like photograph.

A series of dentents are strategically defined on he edge surface of the Graphic Imager and coact with a spring based index tab secured to mat box or hood adjacent each slot to position and secure each of the several openings, one at a time, in a series of pre-calculated positions in registry with the camera lens and its focal length to assure a complete multi-imaged line-free collage when the film is fully exposed and developed.

Accordingly, a principal object of the present invention is to provide a novel and unique device that is attachable to most commercially available cameras and which in sue will permit a plurality of discrete images to be blended into a single photographic film frame.

Another object of the present invention is to provide means and method whereby an amateur can create professional quality vignette and photomontages without restoring to darkroom tricks to combine multiple images into a single picture.

Still another object of the present invention is to provide a graphic imaging assembly which is quick and easily operated to provide an infinite number of photographic effects on any angular relationship relative to the horizon.

Theses and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

BRIEF DESCRIPTION HE DRAWINGS

In the drawings:

FIG. 1. is isometric view of a camera lens having a graphic imaging assembly attached thereto in accordance with the present invention;

FIG. 2. is an isometric view from the rear of a graphic imaging assembly embodying the present invention;

FIG. 3. is a cross-sectional view taken on line 3—3 of the assembly of FIG. 2.

FIG. 4. is a frontal elevation of the graphic imaging assembly of FIG. 2,

FIG. 5. is fragmented enlargement of the slot any identification tab of the housing of a graphic imaging assembly; and FIG. 6 is an isometric view of an adapted ring for installing a graphic imager assembly on camera having externaly threaded lenses;

DESCRIPTION OF PREFERRED EMBODIMENT

Figure 7B:
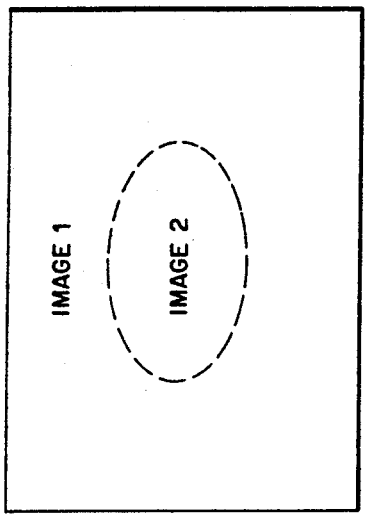
FIG. 7B is a schematic view of a multiple image photograph prepared with the plate shown FIG. 7A.

The present invention relates to a novel and unique imaging assembly for attachment to a standard camera for producing accurately dimensioned multiple image photographs in an easily mastered fashion.

Referring to the drawing in which the imager assembly of the present invention, is identified by the general indicia 10, assembly 10 as shown is FIGS. 1, 2 and 3 comprises a rotation means 11 mounted to the housing 12 for the lens 13 of a camera 14. Assembly 10 comprises a shield 15, which is operatively attached to rotation means 11 for rotation relative to lens 13. Optical interdiction or imager means 16 is insertable into and coacts with shield 15 and with lens 13 in a preselected relationship as will hereinafter be described in detail. In practice, shield 15 is dimensioned so that the mass thereof lies outside the field of view of lens 13. Moreover, optical interdiction or imager means 16 will be disposed in substantially parallel planar relationship to the defined film plane of camera 14. These planes are also in substantial parallel planar relationship to the plane which is tangent to the forwardmost curvature of lens 13.

Shield 15, as shown in FIG. 1-6 is constructed of an opaque material having a non-reflective surface. The actual shape of shield 15 can vary so long as it is divergent and the walls 17 thereof are disposed outside the field of view of lens 13. Good results have been obtained when shield 15 is shaped in a truncated open rectangle as shown in the drawing. A conical frustum having its perimeter wall disposed outwardly in diverging relationship from lens 13 is also suitable. Shield 15 is mounted to lens housing 12 by the interposition of rotation means 11 between shield 15 and lens housing 12. The divergent or larger end 19 of housing 15 extends outwardly from lens housing 12 and circumscribes the field of view through which a picture can be taken by camera 14 while assembly 10 is attached thereto. The perimeter Walls 17 of each shield 15 extend outwardly away from smaller end 18 and hence lens 13.

Referring to FIGS. 1,2 an annular threaded collar 20 extends axially from shield 15 for threaded engagement within the annular ring 21 integrally formed with and circumscribing lens 13 of camera 14. While most commercially available cameras contain an annular ring 21 which is internally threaded, same ring 21 is threaded on the external perimeter thereof for which an annular adaptor 22 is provided as shown in FIG. 6 Adapter 22 has only internal threads 23 and receives camera ring 21 in one end thereof and collar 20 in the other end thereof to complete the juncture.

Shield 15 is secured in place relative to camera lens ring 21 by the action of securing means 24 which will now be described. Means 24 comprises a boss 25 integrally formed with and extending outwardly from end plate 26 of shield 15 and having a screw member 27 inserted therein and activatable relative thereto by the rotation thereof whereupon the distal end 28 thereof bears against annular ring 21 (or adapted 22) to secure shield 15 in a preselected position relative to camera 14.

First slot means 30 and second slot means 31 are defined in registry with each other in shield 15 and coact with each other and with imager or interdiction means 16 to secure and support means 16 in a plane which is substantially parallel to a plane which is tangent to the forward most point on the curvature of lens 13 when assembly 10 is attached to camera 14 in the manner described. As shown in FIG. 4, imager or interdiction means 16, when inserted into slots 30, 31 lies within the field of view of camera 14. As shown, slots 30, 31 are disposed on diametrically opposite surfaces of shield 15 in registry with each other so as to precisely position imager means 16 as will now be more fully described.

Imager or interdiction means 16 comprises an elongated poly portion 32 which extends through shield 15 and lays within the field of view of camera 14. Means 16 interacts with camera 14 to selectively block the passage of light waves through a desired portion of the field of view of camera 14 while passing other light waves therethrough to create the desired optical effect.

A number of preselected special effects can be created by the use of any of the various interdiction means 16 produced in accordance herewith simply by inserting means 16 through slots 30, 31 into shield 15 and across the field of view of camera 14 and locking means 16 in one of several stop points defined thereupon as will no be described.

Each body portion 32 of imager means 16 has a top edge 33 and a bottom edge 34. Each edge 33, 34 has a plurality of detents 37 strategically disposed therealong for interaction with springlock: 35, 36 mounted to shield 15 to selectively position each opening 38 in a preselected position relative to lens 13.

Figure 7A:
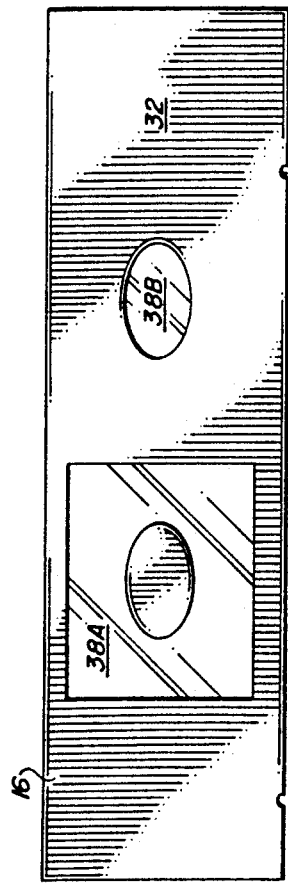
FIG 7A is a graphic imager plate for a two image photograph.

Each imager means 16 contains a plurality of openings 38 and a blocking area 39. When desired, imager means 16 may include a special effects area 40. Blocking area 39 is the opaque portion of imager means 16. Special effects area 40 allows the passage of light but alters it in some fashion such as by soft focus, star. color multiple exposure, or the like. In use, openings 38 and special effects areas 40 are employed in sequence. As shown in FIG. 7A, a simple two object imager means 16 is shown comprising a first open area 38A, a second opening 38B separated by blocking area 39. Another imager means 16, as shown in FIG. 8, comprises a triangular first opening 38C, a left handed tetragonal opening 38D and a right handed tetragonal opening 38E, the balance of the imager means 16 comprising opaque blocking area 39.

A key feature to the present invention which contributes to its ease of handling and the precision of results obtained is provided by the coaction of the tab mechanisms or springlocks 35, 36 with sequential notches or detents 37 to respectively center each opening 38 in the imager means 16 and secure the imager means 16 in a stable fashion relative to the shield 15 and hence camera 14.

Figure 8B:
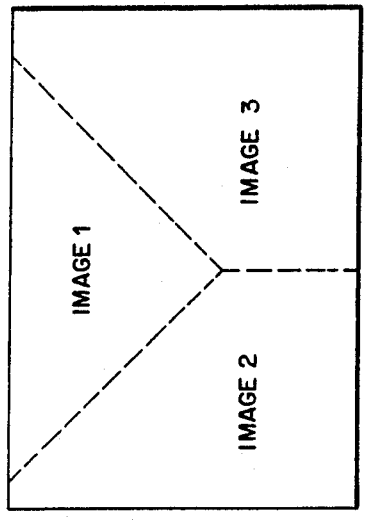
FIG. 8B is a schematic view of a multiple image photograph prepared with the plate shown in FIG. 8A.
Figure 9B:
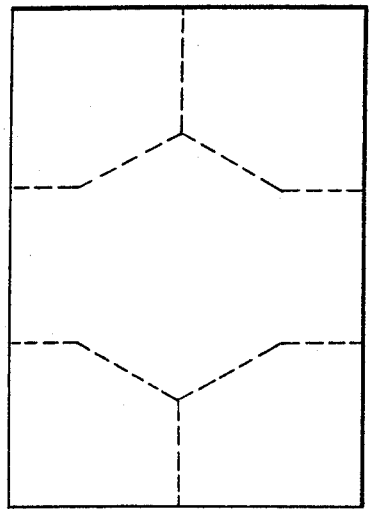
FIG. 9B is a schematic view of a multiple image photograph prepared with the plate shown in FIG. 9A.
Figure 8A:
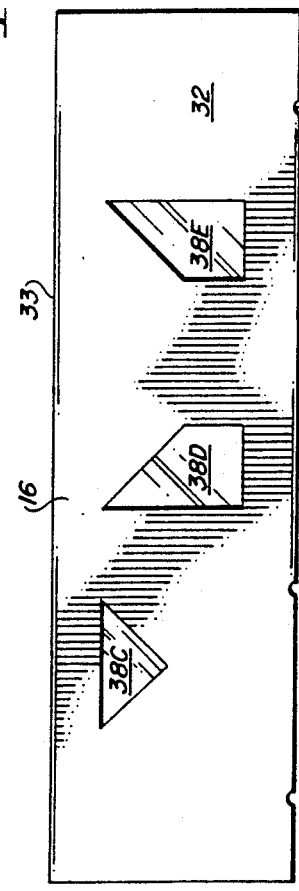
FIG. 8A is another graphic imager plate for a three-image photograph.
Figure 9A:
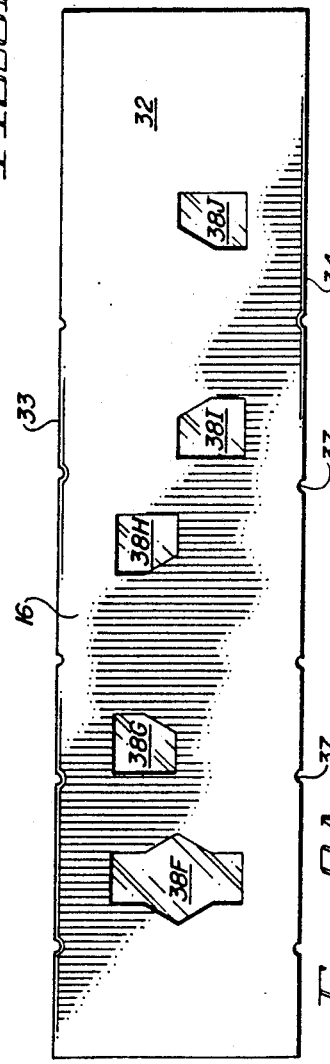
FIG. 9A is another graphic imager plate for a dual-image photograph.

Referring now to FIG. 9A, a more complex five position imager is shown in which the first opening 38F of imager means 16 has a selected portion of the field of view of camera 14 blocked by opaque area 39F while second opening 38G has opaque area 39G blocking out a different portion thereof including area corresponding to opening 38F and so on. Thus openings 38H, 38I and 38J each expose a different area of the film while corresponding opaque areas 39H, 39I and 39J block out all interest. Photographs made with the imager means 16 shown in FIGS. 7A, 8A and 9A, are shown in FIGS. 7B, 8B and 9B respectively.

In any imager means 16, the sum of the open areas 30 and special effects areas 40 will provide all of the desired portions of the field of view of camera 14 into Which it is desired to record images. The total can be less. However, a double exposure of the same area of film would destroy the intended effect. It is therefore mandatory that each opening 28 in any given imager means 16 be used only once in a given sequence.

As previously discussed, rotation means 11 includes flanged ring 21 attachable to camera 14 and adjustable securing means 20 which attach to shield 15 to camera 14 in such a manner that when securing means 24 are loosened the shield 15 is rotatable in and relative to the flanged ring 21 in increments through a full 360°. When a desired position is located, shield 15 is lockable relative to the flanged ring 21 by simply tightening securing means 24.

The technology hereof can be readily expanded into images containing any number of openings wherein each opening provides a discrete exposure. The opening inevitably provide a composite comparable to a single photographic frame. As an analogy. the final photograph, if randomly cut into a plurality of pieces as in making a so-called jig-saw-puzzle thereof, each piece will define a discrete opening 38 in the imager 16 corresponding in location, relative to a mythical box representing the entire film frame, to that position in employed before the picture is defined. The mythical box circumscribing each opening, will have a vertical center line which if extended downward would intersect the lower most edge of imager means 16. These intersections are used to define the several notched detents 37 so that the center line of each box, when its corresponding match is locked by the indexing clips 35, 36 is disposed on the vertical center line of the field of view of camera.

As described herein, graphic imager permits any given format to be contained on a single imager slide member which by the coaction of the registration tabs, is stopped each step at the precise and repeatable position in front of the lens.

In use, the tracking of multiple imager means 16 with the possibility of missing one, the chance for operator error because of faulty memory as to which imager has or has not been used, the time required to coordinate, install and replace a number of small mats, are all eliminated by the present invention.

In practice, the operator determines which composition he desires and selects the appropriate imager 16 to attain the selected result. Next, the operator sets the f-stop to a desired value such. for example 5.6, attaches the flanged ring 21 to the camera lens housing 12. attaches the shield 15 to ring 21, adjusts the shield 15 to the desired position relative the horizontal plane of camera 14 inserts the preselected imager 16, into slot 30, 31 of shield 15, and advances imager 16 until it is stopped by the coaction of springlock 35 in detent 37 as evidenced by a clicking sound, shoot the first picture, advances the imager 16 to the next stop, recocks the camera without advancing the film the double exposure safeguard having been disabled, shoot the second picture, and repeats the procedure until the imager has advanced all the way through the shield 15 and each opening 38 has been shot through once.

In summary, assembly 10 is selected and installed onto camera 14 by rotation means 11. Next, an imaging means 16 having the particular configuration desired is inserted into slot 30 until detent 37 is engaged by springlock 35 which fixes the position of first opening 38 on the camera axis. An exposure is taken by activating camera 14. Without advancing the film in camera 14, imaging means 16 of assembly 10 is advanced to its second stop which places the second opening in the field of view of camera 14. Another exposure is taken without advancing the film. This process is continued until an exposure has been taken once through each opening 38, each serving to interdict a portion of the field of view of camera 14 from the photographic film.

From the foregoing, it is readily apparent that a new and useful means and methods for creating multiple images in a single film frame has been herein described and illustrated which fulfills all of the aforestated objectives in a remarkably unexpected fashion. It is, of course, understood that such modifications, alterations and adaptations as may readily occur to the artisan confronted with this disclosure are intended within the spirit of this invention which is limited only by the scope of the claims appended hereto.

Accordingly, what is claimed is:

1. An imaging assembly for attachment to a camera having a film plane and a field of view to produce multiple discrete images on a single planar film frame in said film plane without producing double exposures, said assembly comprising: a shield member attachable for controlled rotation relative to a camera and having perimeter walls divergent from said camera outside of said field of view slot means defined in opposite of said perimeter walls in registry with each other and oriented to define a plane substantially parallel to the film frame, each of said slot means having spring means operatively associated therewith; an elongated imager means having a plurality of complementary openings defined therethrough and a plurality of detents corresponding one to each of said openings defined therein and strategically disposed relative to said openings and selectively coactive with said springlock means to selectively position the corresponding one of said openings in said imager means relative to said camera to permit the passage of light through said opening onto said film frame.

2. An assembly according to claim 1 in which said perimeter walls define a symmetrical frustum shaped housing having an open front and an open rear said slot means being operatively disposed in said housing intermediate said front any said rear.

3. An assembly according to claim 2 in which said imager means is operatively insertable into said slot means and sequentially movable therethrough in a plurality of controlled steps, said imager means sequentially interacting with lightwaves within said field of view of said camera at each of said controlled steps to expose a different portion of a film frame in said camera and create a photo montage-like photograph thereon.

4. An assembly according to claim 3 in which said slot means comprises a pair of registered slots disposed in a plane parallel to the film plane of said camera.

5. A device according to claim 4 in which said imager means is operatively inserted into said housing any actuatable to pass sequentially place said complementary openings into said field of view.

6. A device according to claim 5 in which said imager means comprises an elongated rectangular body portion having a proximal end, a distal end, an upper edge, and a lower edge, said detents being disposed in said lower edge so that when each is engaged by said springlock means, the corresponding one of said complementary openings is disposed in a position relative to the center of said field of view so that when said film has been exposed once to each opening, a multiple image composite is created upon said film.

7. An assembly according to claim 1 in which said imager means is operatively insertable into said slot means and sequentially movable therethrough in a plurality of controlled steps said imager means sequentially interacting with lightwaves within said field of view of said camera at each of said controlled steps to expose a different portion of a film frame in said camera and create a photo montage-like photograph thereon.

8. An assembly according to claim 7 in which said slot means comprises a pair of registered slots disposed in a plane parallel to the film plane of said camera.

9. A device according to claim 8 in which said imager means is operatively inserted into said housing and actuatable to pass sequentially place said complementary openings into said field of view.

10. A device according to claim 9 in which said imager means comprises an elongated rectangular body portion having a proximal end, a distal end, an upper edge, and a lower edge, said detents being disposed in said lower edge so that when each is engaged by said springlock means the corresponding one of said complementary openings is disposed in a position relative to the center of said field of view so that when said film has been exposed once to each opening, a multiple image composite is created upon said film.

11. An assembly according to claim 1 in which rotational means are operatively interposed between said camera and said shield member.

* * * * *